United States Patent
Koster et al.

(10) Patent No.: US 10,552,119 B2
(45) Date of Patent: Feb. 4, 2020

(54) DYNAMIC MANAGEMENT OF NUMERICAL REPRESENTATION IN A DISTRIBUTED MATRIX PROCESSOR ARCHITECTURE

(71) Applicant: Intel Corporation, Santa Clara, CA (US)

(72) Inventors: Urs Koster, San Diego, CA (US); William Howard Constable, San Diego, CA (US); Luke James Hornof, Oakland, CA (US); Carey Kevin Kloss, Los Altos, CA (US); Amir Khosrowshahi, San Diego, CA (US); Scott Gray, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 931 days.

(21) Appl. No.: 15/143,293

(22) Filed: Apr. 29, 2016

(65) Prior Publication Data
US 2017/0316307 A1     Nov. 2, 2017

(51) Int. Cl.
G06F 7/00          (2006.01)

(52) U.S. Cl.
CPC ..................... G06F 7/00 (2013.01)

(58) Field of Classification Search
None
See application file for complete search history.

(56) References Cited

U.S. PATENT DOCUMENTS

2013/0212052 A1   8/2013  Yu et al.
2014/0067735 A1   3/2014  Yu et al.
2015/0238148 A1   8/2015  Georgescu et al.
2016/0013773 A1   1/2016  Dourbal
2016/0098633 A1   4/2016  Min
2017/0061279 A1*  3/2017  Yang ................... G06N 3/084

FOREIGN PATENT DOCUMENTS

WO     2017189186 A1     11/2017

OTHER PUBLICATIONS

Advances in Neural Information Processing Systems; Alex Krizhevsky, Ilya Sutskever, and Geoffrey E Hinton. ImageNet classification with deep convolutional neural networks; 2012.
Advances in Neural Information Processing Systems; Vincent Vanhoucke, Andrew Senior, and Mark Z Mao; Improving the speed of neural networks on CPUs; 2011.

(Continued)

*Primary Examiner* — Alan Chen
(74) *Attorney, Agent, or Firm* — Alliance IP, LLC

(57) ABSTRACT

A system receives and executes a sequence of tensor instructions, for example, instructions for performing a neural network computation. The system may be implemented as a multiprocessor architecture, for example, hardware for performing a neural network computation. A tensor instruction specifies a tensor computation receiving one or more input tensors for determining an output tensor. The system stores a decimal position associated with a plurality of values of a tensor. The system performs the tensor computation of a tensor instruction to determine a plurality of values of the output tensor. The system collects statistics describing the plurality of values of the output tensor and determines a decimal position for the plurality of values based on the collected statistics.

26 Claims, 13 Drawing Sheets

(56) References Cited

OTHER PUBLICATIONS arXiv.org; Daisuke Miyashita, Edward H. Lee, and Boris Murmann; Convolutional neural networks using logarithmic data representation; Mar. 3, 2016 (version 1 submitted).
arXiv.org; Darryl D. Lin, Sachin S. Talathi, and V. Sreekanth Annapureddy; Fixed point quantization of deep convolutional networks; Nov. 19, 2015 (version 1 submitted).
arXiv.org; Fisher Yu, Yinda Zhang, Shuran Song, Ari Seff, and Jianxiong Xiao. LSUN: Construction of a large-scale image dataset using deep learning with humans in the loop; Jun. 10, 2015 (version 1 submitted).
arXiv.org; Ganesh Venkatesh, Eriko Nurvitadhi, and Debbie Marr; Accelerating deep convolutional networks using low-precision and sparsity; Oct. 2, 2016 (submitted).
arXiv.org; Ray Hubara, Matthieu Courbariaux, Daniel Soudry, Ran El-Yaniv, and Yoshua Bengio; Quantized neural networks: Training neural networks with low precision weights and activations; Sep. 22, 2016 (submitted).
arXiv.org; Kaiming He, Xiangyu Zhang, Shaoqing Ren, and Jian Sun; Deep residual learning for image recognition; Dec. 10, 2015 (submitted).
arXiv.org; Kaiming He, Xiangyu Zhang, Shaoqing Ren, and Jian Sun; Identity mappings in deep residual networks; Mar. 16, 2016 (version 1 submitted).
arXiv.org; Martin Abadi, et al.; TensorFlow: Large-scale machine learning on heterogeneous distributed systems, Mar. 14, 2016 (version 1 submitted).
arXiv.org; Martin Arjovsky, Soumith Chintala, and Léon Bottou; Wasserstein GAN; Jan. 26, 2017 (version 1 submitted).
arXiv.org; Matthieu Courbariaux and Yoshua Bengio; BinaryNet: Training deep neural networks with weights and activations constrained to +1 or -1; Feb. 9, 2016 (version 1 submitted).
arXiv.org; Matthieu Courbariaux, Yoshua Bengio, and Jean-Pierre David; BinaryConnect: Training deep neural networks with binary weights during propagations; Nov. 2, 2015 (version 1 submitted).
arXiv.org; Matthieu Courbariaux, Yoshua Bengio, and Jean-Pierre David; Training deep neural networks with low precision multiplications; Dec. 22, 2014 (version 1 submitted).
arXiv.org; Minje Kim and Paris Smaragdis; Bitwise neural networks; Jan. 22, 2016 (submitted).
arXiv.org; Mohammad Rastegari, Vicente Ordonez, Joseph Redmon, and Ali Farhadi. XNOR-Net: ImageNet classification using binary convolutional neural networks; Mar. 16, 2016 (version 1 submitted).
arXiv.org; Naveen Mellempudi, Abhisek Kundu, Dipankar Das, Dheevatsa Mudigere, and Bharat Kaul; Mixed low-precision deep learning inference using dynamic fixed point; Jan. 31, 2017 (version 1 submitted).
arXiv.org; Norman P Jouppi, Cliff Young, Nishant Path, David Patterson, Gaurav Agrawal, Raminder Bajwa, Sarah Bates, Suresh Bhatia, Nan Boden, Al Borchers, et al.; In-datacenter performance analysis of a tensor processing unit; Apr. 16, 2017 (submitted).
arXiv.org; Shuchang Zhou, Zekun Ni, Xinyu Zhou, He Wen, Yuxin Wu, and Yuheng Zou. DoReFa-Net: Training low bitwidth convolutional neural networks with low bitwidth gradients; Jun. 20, 2016 (version 1 submitted).
arXiv.org; Suyog Gupta, Ankur Agrawal, Kailash Gopalakrishnan, and Pritish Narayanan. Deep learning with limited numerical precision; Feb. 9, 2015 (submitted).
arXiv.org; Zhouhan Lin, Matthieu Courbariaux, Roland Memisevic, and Yoshua Bengio; Neural networks with few multiplications; Oct. 11, 2015 (version 1 submitted).
arXiv.org; Zhourui Song, Zhenyu Liu, Dongsheng Wang. Computation Error Analysis of Block Floating Point Arithmetic Oriented Convolution Neural Network Accelerator Design; Sep. 22, 2017 (version 1 submitted).
IEEE Pacific Rim Conference on Communications, Computers and Signal Processing; Darrell Williamson; Dynamically scaled fixed point arithmetic; pp. 315-318; May 9-10, 1991.
Institute of Electrical and Electronics Engineers; Kyuyeon Hwang and Wonyong Sung; Fixed-point feedforward deep neural network design using weights +1, 0, and -1 in Signal Processing Systems (SiPS), 2014 IEEE Workshop; pp. 1-6;2014.
Interspeech; Frank Seide, Hao Fu, Jasha Droppo, Gang Li, and Dong Yu; 1-bit stochastic gradient descent and its application to data-parallel distributed training of speech DNNs; pp. 1058-1062; Sep. 14, 2014.
Texas Instruments; David Elam and Cesar Iovescu, A Block Floating Point Implementation for an N-Point FFT on the TMS320C55x DSP; Sep. 2003.
International Search Report and Written Opinion in International Application No. PCT/US2017/025816, dated Jul. 18, 2017, 8 pages.

\* cited by examiner

Fig. 6B

DYNAMIC MANAGEMENT OF NUMERICAL REPRESENTATION IN A DISTRIBUTED MATRIX PROCESSOR ARCHITECTURE

BACKGROUND

This invention generally relates to performing computations using a matrix processor architecture and more specifically to dynamically managing numerical representation of values of a tensor, for example, in a distributed matrix processor architecture used for implementing artificial neural networks.

Distributed and single processor architectures are used for efficient processing of computations, for example, matrix computations. A distributed processor architecture may be used for implementing artificial neural networks. Artificial neural networks are used to solve tasks that are difficult to solve using traditional computational models. For example, an artificial neural network can be trained to perform pattern recognition tasks that would be extremely difficult to implement using other traditional programming paradigms. Several tasks performed using distributed processor architectures such as artificial neural networks require tensor (or matrix) computations. In order to maintain a high level of precision when performing tensor computations, conventional architectures use floating point number representations for storing values of the tensors. These techniques for representing and performing operations using floating point numbers require significant hardware resources.

SUMMARY

An embodiment of the invention includes a computer system comprising one or more processors for performing neural network computations and a storage medium for storing instructions for execution by the one or more processors. The system receives a sequence of tensor instructions for execution. The system may perform multiple iterations that execute the sequence of tensor instructions. A tensor instruction specifies a tensor computation associated with a neural network computation. The tensor computation receives one or more input tensors and determines an output tensor representing the result of the tensor computation. Each tensor comprises a plurality of values stored as numbers. The system stores a decimal position associated with the plurality of values of each tensor. The system determines a plurality of values of the output tensor by performing the tensor computation specified in the tensor instruction. The system collects statistics describing an aggregate measure of sizes of values of the plurality of values of the output tensor and determines a new value of the decimal position for the plurality of values based on the collected statistics. The system stores the new value of the decimal position in association with the output tensor, for example, for processing subsequent iterations of the sequence of tensor instructions.

Another embodiment of the invention comprises computer readable storage medium that stores instructions for executing a sequence of tensor instructions. A tensor instruction is identified from the sequence of instructions. The tensor instruction specifies a tensor computation receiving one or more input tensors and determining an output tensor. For each tensor, a decimal position associated with a plurality of values of the input tensor is stored. A plurality of values of the output tensor is determined by performing the tensor computation specified in the tensor instruction. Statistics describing an aggregate measure of sizes of values of the plurality of values of the output tensor are collected. A new value of the decimal position is determined for the plurality of values of the output tensor based on the collected statistics. The new value of the decimal position associated with the output tensor is stored, and may be used while executing subsequent iterations of the sequence of tensor instructions.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG.

FIGS. 6A-6B shows an example of data stored for a tensor, in accordance with the embodiment.

A detailed description of one or more embodiments of the invention is provided below along with accompanying figures that illustrate the embodiments. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide an understanding of the invention. These details are provided for the purpose of example and the invention may be practiced according to the claims without some or all of these specific details.

DETAILED DESCRIPTION

Overview of System Environment

Figure 1:
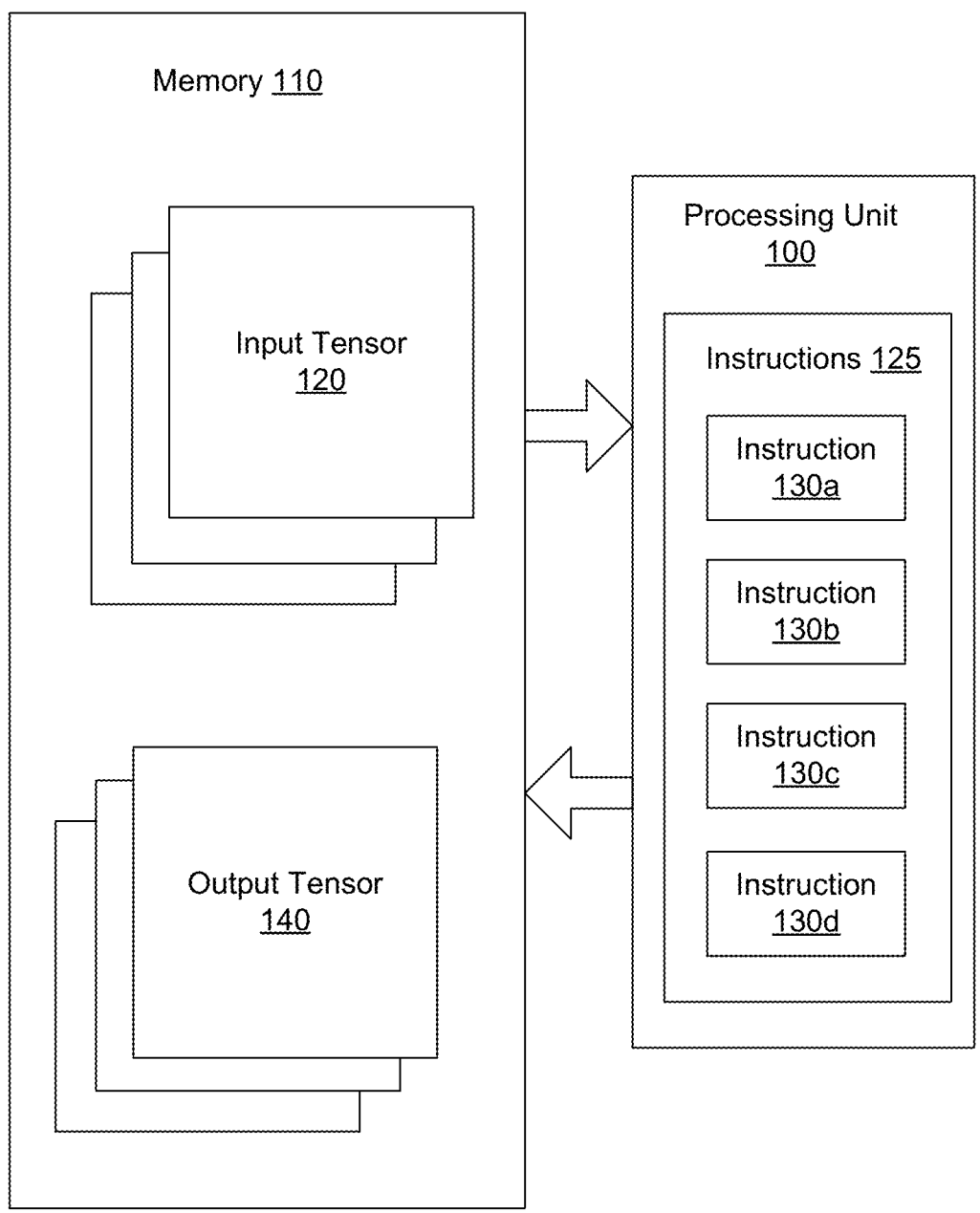
(FIG. 1 illustrates a processing unit for executing instructions that process input tensors to generate output tensors, in accordance with an embodiment.

FIG. 1 illustrates a processing unit for executing instructions that process input tensors to generate output tensors, in accordance with an embodiment. A tensor is also referred to herein as a matrix. A tensor may be single dimensional (for example, n×1 tensor or a vector), two dimensional (for example, m×n tensor), or multi-dimensional (for example, a four dimensional tensor with dimensions m×n×r×p). A tensor typically comprises a plurality of values, but may also represent a single value (for example, a scalar value represented as a 1×1 tensor.) FIG. 1 and the other figures use like reference numerals to identify like elements. A letter after a reference numeral, such as "130a," indicates that the text refers specifically to the element having that particular reference numeral. A reference numeral in the text without a following letter, such as "130," refers to any or all of the elements in the figures bearing that reference numeral (e.g. "130" in the text refers to reference numerals "130a" and/or "130n" in the figures).

The processing unit 100 receives and stores a sequence of tensor instructions 125. The sequence of instructions 125 comprises one or more tensor instructions, for example, 130a, 130b, 130c, and 130d. The processing unit 100 executes the tensor instructions 130 from the sequence 125 in a particular order, for example, the order in which the tensor instructions 130 are specified, subject to special instructions that may cause the order of execution to change. Each tensor instruction 130 specifies a tensor computation, for example, multiplication of tensors, addition of tensors, multiplication of a tensor by a scalar, and so on.

A tensor instruction specifies one or more input tensors that are received as input and processed by the tensor instructions. A tensor instruction specifies one or more output tensors for storing the results of the tensor computation performed on the input tensors. For example, a tensor instruction "A=B*C" specifies tensors B and C as input tensors, the operator "*" as the tensor computation to be performed on the input tensors B and C, and tensor A as the output tensor for storing the results.

As shown in FIG. 1, the input tensors and the output tensors are stored in memory 110 associated with the processing unit 100. The memory may be implemented on an integrated circuit of the processing unit 100 or may be implemented as one or more integrated circuits that are separate from the integrated circuit of the processing unit 100. A processing unit 100 may be referred to as an electronic processor or one or more electronic processors.

Figure 2:
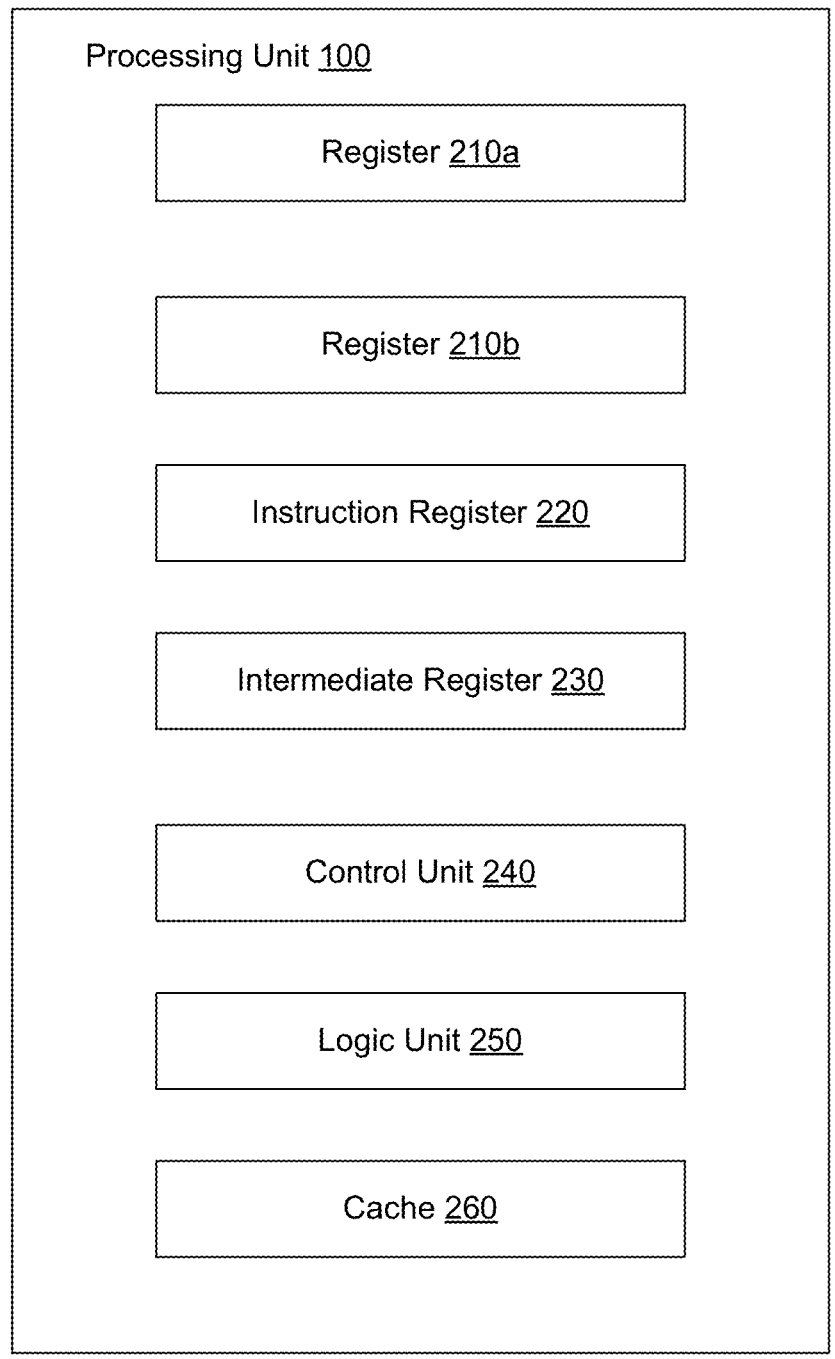
FIG. 2 shows various components of the processing unit configured to execute tensor instructions, in accordance with an embodiment.

FIG. 2 shows various components of the processing unit configured to execute tensor instructions, in accordance with an embodiment. Processing unit 100 includes register 210a, register 210b, instruction register 220, intermediate register 230, control unit 240, logic unit 250, and cache 260. In some embodiments, processing unit 100 is a specialized processor developed to implement an artificial neural network. The processing unit 100 may be a graphics processing unit (GPU) or a central processing unit (CPU). Instruction register 220 may be loaded with a specialized processor instruction to update an artificial neural network. For example, a processor instruction to perform at least a portion of a forward propagation of the artificial neural network is loaded into instruction register 220. Control unit 240 controls and directs the flow of instructions and data in processing unit 100. For example, control unit 240 loads instructions to be processed in instruction register 220 and directs flow of data to components to perform the instruction loaded in instruction register 220. Control unit 240 may include decoders and multiplexors.

Cache 260 includes memory storage that can store instructions and data for processing unit 100. For example, obtaining data from a memory external to processing unit 100 may take a relatively long time and cache 260 is a smaller, faster memory which stores copies of data processed, to be processed, or likely processed by processing unit 100 from main memory locations. Cache 260 may include a plurality of cache hierarchies.

Register 210a and register 210b are registers that can store data used for performing an operation. For example, register 210a and register 210b are faster storages than cache 260 and may be loaded with data from cache 260 for performing an operation. In one example, an instruction loaded in instruction register 220 may identify register 210a and/or register 210b as including content to be utilized in performing the operation of the instruction. Registers 210a and 210b may be included in a set of a plurality of general purpose registers of processing unit 100. The size (e.g., number of bits able to be stored) of register 210a and register 210b may be different or same in various different embodiments. In some embodiments, register 210a and register 210b are configured to be able to store two dimensional data (e.g., matrix) and/or other single or multi-dimensional data.

Logic unit 250 performs calculations and operations. For example, logic unit 250 performs a mathematical operation specified by an instruction loaded in instruction register 220. A result of a logic unit 250 is stored in intermediate register 230. For example, a multiplication operation result of multiplying data in register 210a with data in register 210b performed by logic unit 250 is stored in intermediate register 230. In some embodiments, a size of intermediate register 230 is larger than a size of register 210a or a size of register 210b. For example, a number of bits that can be stored in intermediate register 230 is larger than the number of bits that can be stored in either register 210a or register 210b to retain intermediate data precision as a result of the operation performed by logic unit 250. In one example, register 210a and register 210b are both 16 bits in size and intermediate register 230 is double (e.g., 32 bits) in size to accommodate the maximum number of bits potentially required to represent a resulting product of multiplying two 16 bit numbers together. The different registers shown in FIG. 2 may be of all the same size or of one or more different sizes.

The contents of processing unit 100 shown in FIG. 2 have been simplified to illustrate the example. Although single instances of many of the components shown in FIG. 1 have been shown to simplify the diagram, additional instances of any of the components shown in FIG. 1 may exist in processing unit 100. For example, processing unit 100 may include a plurality of processor cores each with its own set of different types of registers, control unit, logic unit and cache. Some components used in processing units are not shown in FIG. 2. For example, common processor components such as buses and other data communication components may exist. The components shown in FIG. 1 may be made of transistors, logic gates, multiplexors, storage cells, etc. In some embodiments, processing unit 100 is a virtual processor emulated in software.

Artificial Neural Networks

Figure 3:
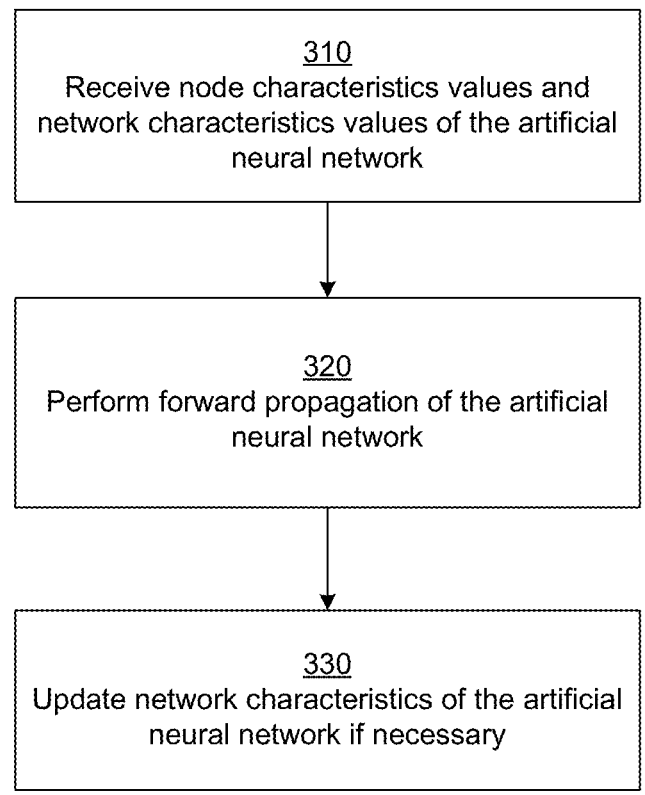
FIG. 3 illustrates an artificial neural network system, in accordance with an embodiment.

FIG. 3 is a flowchart illustrating an embodiment of a process for updating a state of an artificial neural network. In some embodiments, the process of FIG. 3 is at least in part implemented on processing unit 100 of FIG. 1. The artificial neural network may be utilized to perform tasks such as classification, noise reduction, prediction, etc.

The processing units 100 receive 310, node characteristics and network characteristics of the artificial neural network. In artificial neural networks, nodes are connected together to form a network. The nodes of the neural network may represent input, intermediate, and output data and may be organized as input nodes, hidden nodes, and output nodes. The nodes may also be grouped together in various hierarchy levels. A node characteristic may represent data such as a pixel and other data processed using the neural network. The node characteristics values may be any values or parameters associated with a node of the neural network. Each node has an input and an output.

Each connection between the nodes (e.g., network characteristics) may be represented by a weight (e.g., numerical parameter determined in a training/learning process). In some embodiments, the connection between two nodes is a network characteristic. The weight of the connection may represent the strength of the connection. In some embodiments, a node of one hierarchy grouping level may only connect to one or more nodes in an adjacent hierarchy grouping level. In some embodiments, network characteristics include the weights of the connection between nodes of the neural network. The network characteristics may be any values or parameters associated with connections of nodes of the neural network.

In some embodiments, receiving the node characteristics and weight characteristics includes receiving activation values (e.g., node characteristics) and weights (e.g., network characteristics) for the neural network. In some embodiments, receiving the node characteristics and network characteristics includes determining the node characteristics and network characteristics. In some embodiments, the received node characteristics are input values of the neural network. In some embodiments, the node characteristics and network characteristics are provided as one or more matrices or tensors. For example, a first matrix of node characteristics and a second matrix of network characteristics are received. The matrices may specify the nodes in each node level and the connections between the nodes with its associated weight value for the neural network.

The processing units 100 perform 320 forward propagation of the neural network. In some embodiments, performing forward propagation includes updating activation values of nodes of the neural network. For example for each activation value to be updated, a weighted sum of connected previous level activation nodes is determined and applied to a function (e.g., non-linear sigmoid function) to determine the updated activation value.

Figure 4:
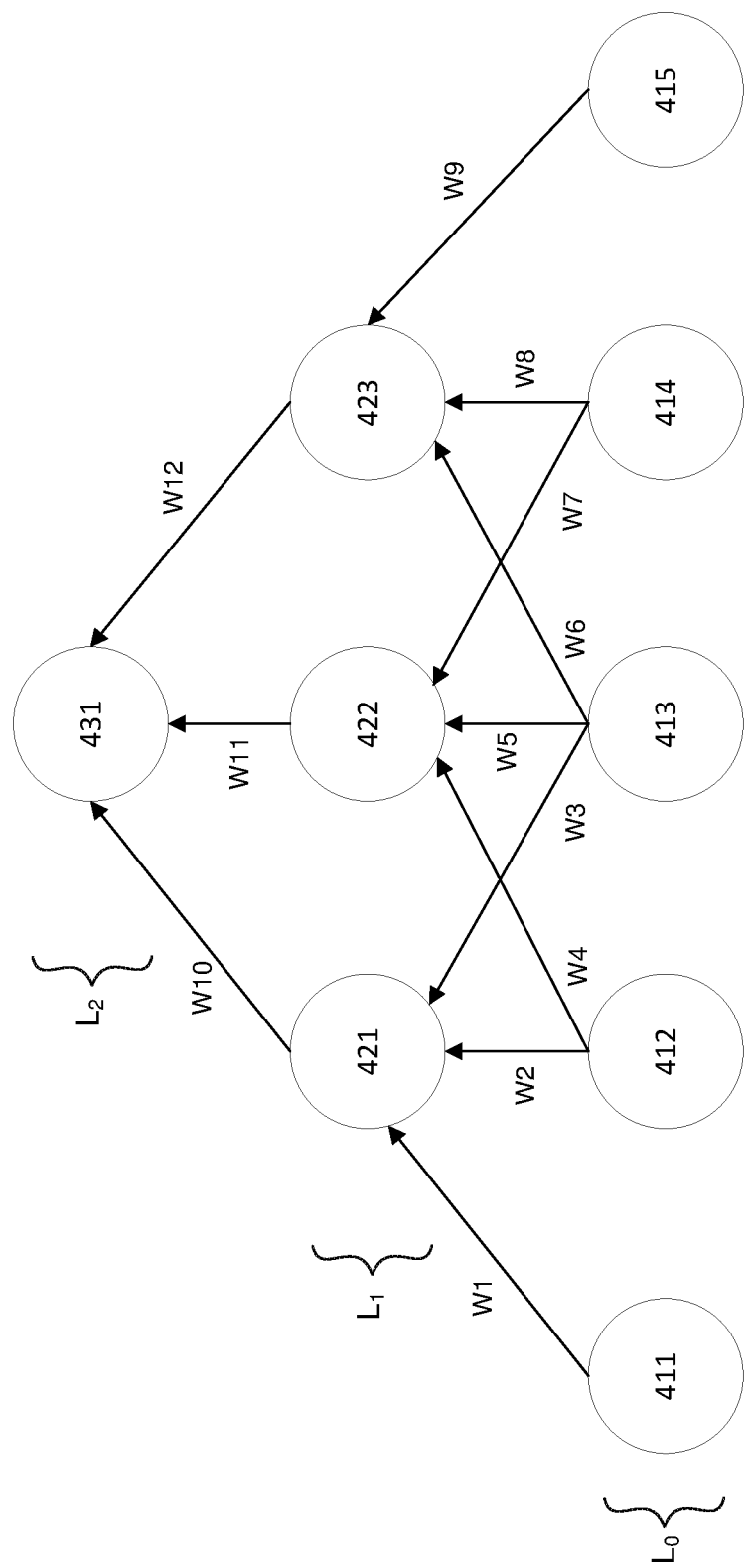
FIG. 4 is an example neural network illustrating the various operations related to an artificial neural network, according to an embodiment.

FIG. 4 is an example neural network illustrating the various operations related to an artificial neural network, according to an embodiment. In the example neural network shown in FIG. 4, the first hierarchy layer grouping of nodes, $L_0$ nodes, includes nodes 411, 412, 413, 414, and 415. The second hierarchy layer grouping of nodes, $L_1$ nodes, includes nodes 421, 422, and 423. The third hierarchy layer grouping of nodes, $L_2$ nodes, includes node 431. The connections between the nodes are associated with weights (i.e., W1-W12) as shown. In one example, in 310, activation values of $L_0$ nodes and all weights shown (i.e., W1-W12) are received. In some embodiments, performing forward propagation includes determining activation values for $L_1$ nodes and then utilizing the $L_1$ activation values to determine the activation value for the $L_2$ node. Activation values for each successive level of nodes are updated sequentially.

For example to perform forward propagation and update the activation value of node 421, a weighted sum of activation values of connected lower level $L_0$ nodes is determined (e.g., $L_0$ nodes 411, 412, and 413 are connected to node 421). In some embodiments, each of the activation values is multiplied by its corresponding weight value (e.g., connection to node 411 corresponds to W1, connection to node 412 corresponds to W2, and connection to node 413 corresponds to W3) before being added together. The weighted sum may be referred to as the pre-activation value. In order to determine the updated activation value (e.g., updated activation value of node 421), the pre-activation value is applied to a function (e.g., non-linear sigmoid function) to determine the updated activation value. The updated activation values for nodes 422 and 423 may be similarly determined. Although only three levels of nodes have been shown, additional or fewer levels may exist in other embodiments.

Returning to FIG. 3, in some embodiments, performing the forward propagation includes performing tensor operations. For example, a first tensor of node values for the nodes in each node level and a second tensor of weight values of the connections between the nodes may be multiplied together to obtain a resulting matrix that represents the pre-activation values.

At 330, network characteristics of the neural network are updated, if applicable. For example, the weights utilized to perform forward propagation may be modified to improve the artificial neural network. In various embodiments, weights of the neural network are periodically and/or dynamically updated (e.g., weights of the neural network are updated until the stopping criteria have been met). In some embodiments, backpropagation (e.g., backward propagation of errors) is utilized with an optimization method such as gradient descent to update the network characteristics.

After network characteristics are updated (e.g., after backpropagation is performed), forward propagation is performed again using the updated weights and it is determined whether a stopping criterion has been met, if applicable. In some embodiments, determining whether the stopping criterion has been met includes comparing an output of the forward propagation (e.g., activation value(s) determined during forward propagation) with an expected output (e.g., expected activation value(s)).

If it is determined that the stopping criteria have not been met, backpropagation may be performed again. The cycle of performing backpropagation, forward propagation using the resulting weights of backpropagation, and testing for stopping criteria may be repeated until the stopping criteria have been met. If it is determined that the stopping criteria have been met, the process of FIG. 3 ends. Techniques for updating an artificial neural network using a flexible point representation are disclosed in U.S. patent application Ser. No. 14/597,091, filed on Jan. 14, 2015, which is incorporated by reference herein in its entirety.

System Architecture for Managing Decimal Position of a Tensor

Figure 5:
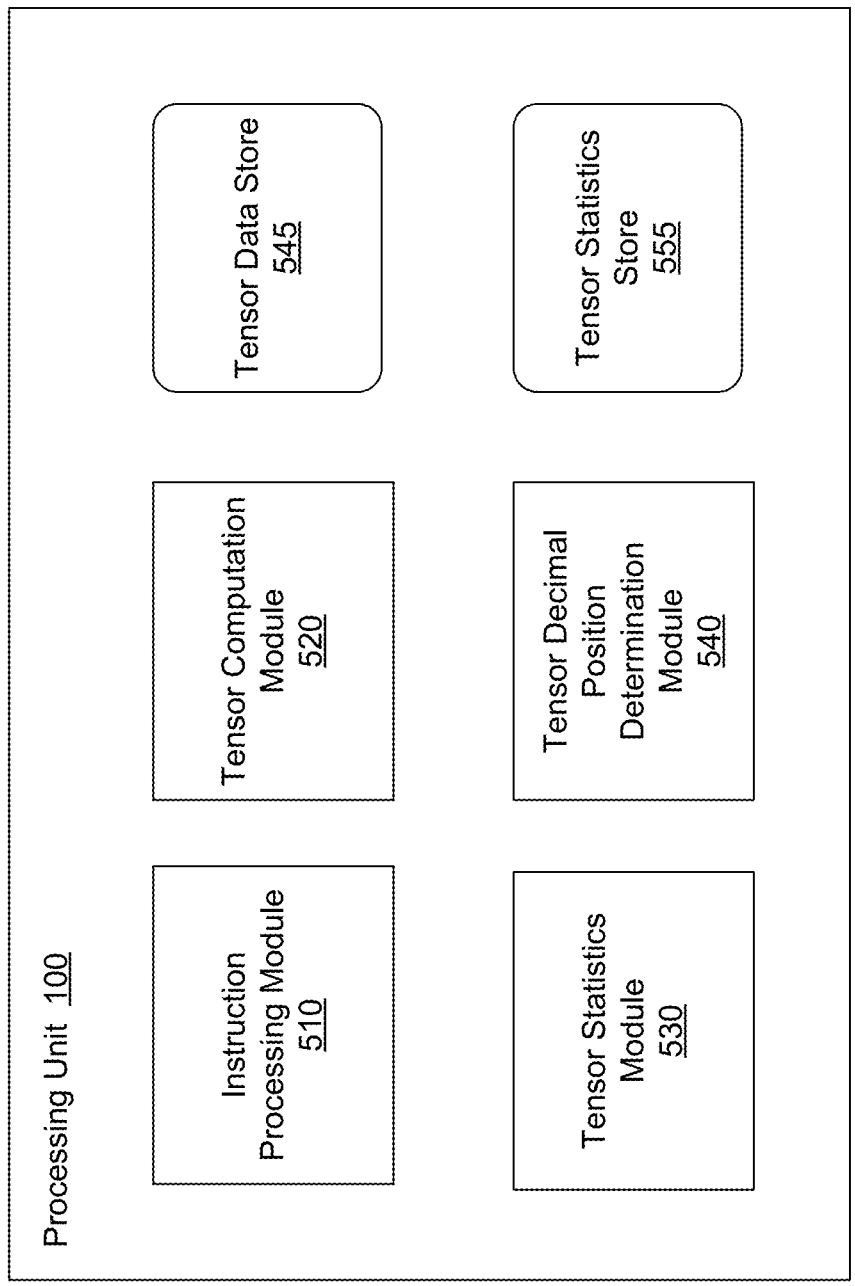
FIG. 5 is a system architecture diagram illustrating various modules comprising instructions processed by a processing unit, in accordance with the embodiment.

FIG. 5 is a system architecture diagram illustrating various modules comprising instructions processed by a processing unit, in accordance with the embodiment. These modules store instructions that are executed by the processing unit 100. These instructions may be stored in a memory of the processing unit 100, in a memory in an integrated circuit coupled to the processing unit 100, or any other configuration that allows the processing unit to access instructions and execute them. The processing unit 100 includes an instruction processing module 510, a tensor computation module 520, a tensor statistics module 530, an tensor decimal position determination module 540, a tensor data store 545, and a tensor statistics store 555. Other embodiments may include fewer, more, or different modules. Functionality indicated herein as being performed by a module may be performed by other modules than those indicated herein.

The instruction processing module 510 receives a sequence of tensor instructions and processes them. Each tensor instruction processed by the instruction processing module 510 specifies one or more of: a tensor computation, one or more input tensors, and one or more output tensors for storing the result of the tensor computation. In an embodiment, the instruction processing module 510 stores the tensor instructions in a cache for fast access. The instruction processing module 510 may process the sequence of instructions repeatedly for an artificial neural network computation. In an embodiment, the sequence of instructions stored in a cache of the instruction processing module 510 is pushed out of the cache to allow the cache to store other data processed by the instruction processing module 510. Accordingly, the instruction processing module 510 may receive the sequence of instructions for each new iteration if the sequence of instructions gets pushed out of the cache while processing the previous iteration.

The tensor computation module 520 performs tensor computations specified in the tensor instructions. Examples of tensor computations performed by the tensor computation module 520 include matrix multiplication of tensors, dot product of tensors, multiplication of tensors, addition of tensors, multiplication of a tensor by a scalar, activation functions (sigmoid, rectification) and reductions (sum along an axis), convolution, maximum, minimum, logarithm, sine, cosine, tangent, and so on. The tensor data store 545 stores tensors processed by the tensor instructions. A tensor stored in the tensor data store 545 typically comprises a plurality of values, but may also represent a scalar. The tensor data store 545 may also stores a value representing the decimal position for the plurality of values of the tensor. In an embodiment, the tensor data store 545 stores multiple decimal positions, each decimal position for a subset of values of the tensor, as illustrated in FIG. 6B.

The tensor statistics module 530 collects statistics describing values of a tensor. The tensor statistics module 530 determines a metric based on the collected statistics, for example, a maximum absolute value for the plurality of values of a tensor. In other embodiments, the tensor statistics module 530 may determine different metrics based on the statistics, for example, a median of the plurality of values, an average of absolute values of the plurality of values, and so on.

The tensor statistics module 530 determines metric values for each iteration of execution of a tensor instruction and stores the metric values for past iterations in the tensor statistics store 555. In an embodiment, the tensor statistics store 555 is a queue structure configured to store metric values corresponding to a tensor for the past N iterations of execution of a tensor instruction. The value N is a predetermined constant value that may be configurable. The queue data structure deletes the metric value corresponding to the oldest execution of the instruction when a new metric value is added to the queue data structure and the queue already stores N values. In various embodiments, the tensor statistics store 555 may be represented as a list, an array, a tree or any other data structure configured to store a plurality of values.

The tensor decimal position determination module 540 determines the value of the decimal position for an output tensor obtained by executing a tensor instruction. The tensor decimal position determination module 540 determines the decimal position based on the statistics collected by the tensor statistics module 530. Various embodiments of processes for determining decimal positions for tensors are illustrated in FIGS. 7, 8, 9, 11 but are not limited to these processes.

Figure 6A:
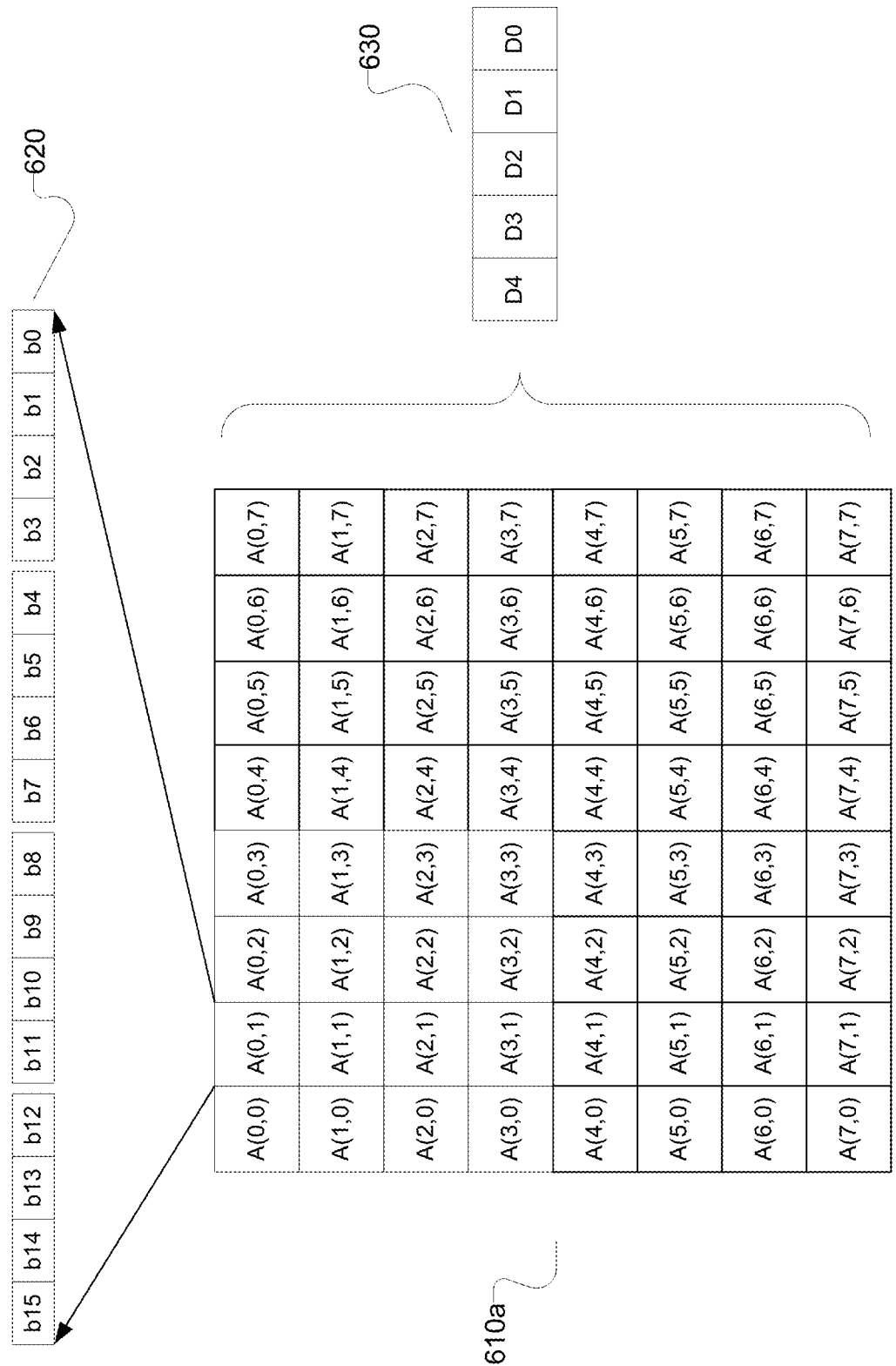
Figure 6B:
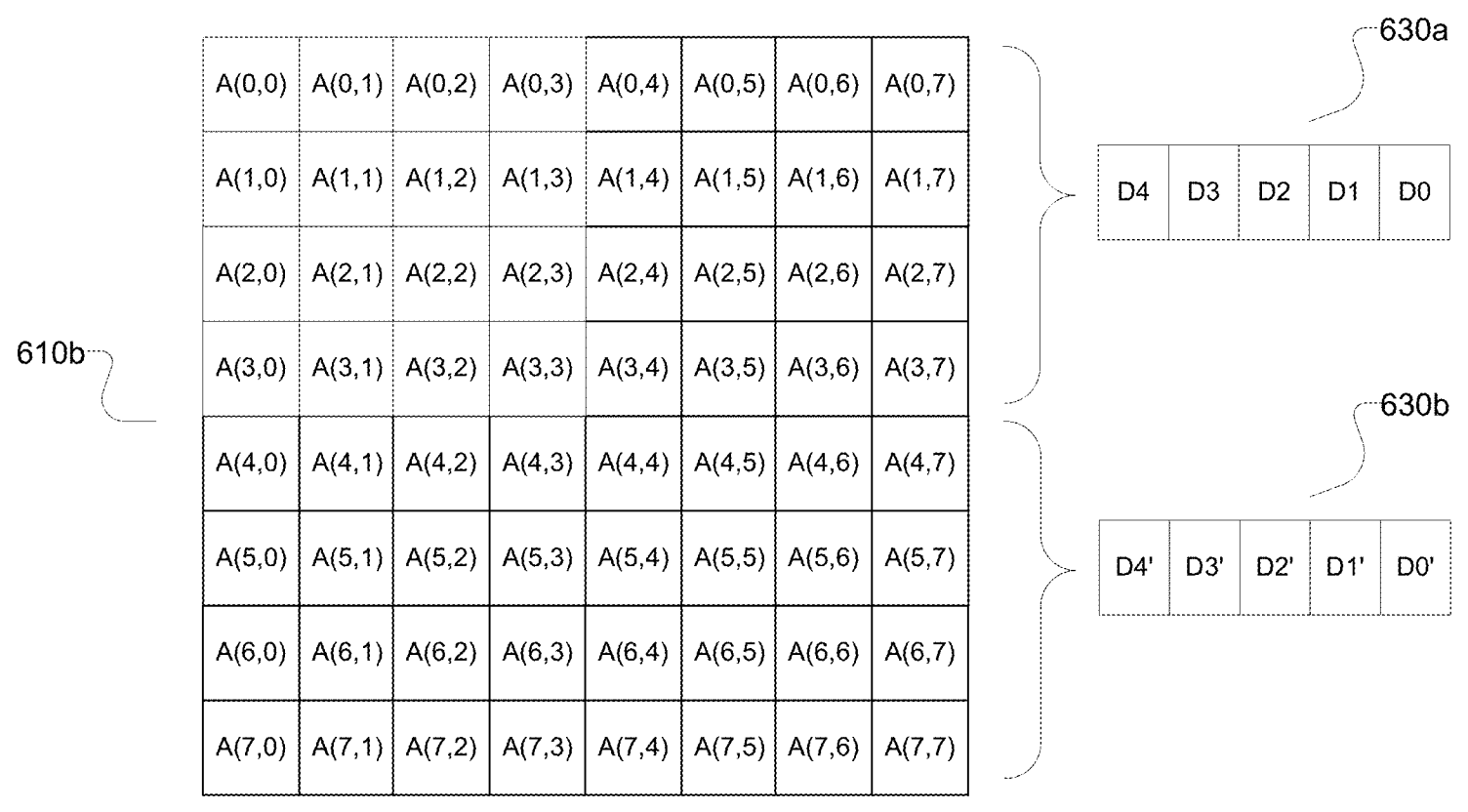

FIGS. 6A-6B shows an example of data stored for a tensor, in accordance with the embodiment. The example tensor 610 shown in FIG. 6 is stored in the tensor data store 545. The example illustrated in FIG. 6 shows a two-dimensional tensor of size 8×8. However, the representation applies to other sizes of tensors, for example, an M×N tensor where M and N are any positive integers. Furthermore, the representation shown in FIG. 6 applies to tensors having other dimensions, for example, one-dimensional tensors, three-dimensional tensors, or four-dimensional tensors.

As shown in FIG. 6, each value of the tensor 610 is represented as a 16 bit number 620. However, in other embodiments, the values of the tensors may be represented using more or fewer bits. Furthermore, as shown in FIG. 6A, the tensor 610 is associated with a decimal position 630. In an embodiment, the decimal position 630 is stored in a variable configured to modify the stored value of the decimal position. The decimal position 630 represents the decimal position of a plurality of values of the tensor 610.

The plurality of values associated with the decimal position 630 may be a subset of the values of the tensor 610 or all values of the tensor 610. The example illustrated in FIG. 6A shows that the decimal position 630 is associated with all values of the tensor 610a. However, the example shown in FIG. 6B shows a decimal position value 630a associated with one subset of the tensor 610b and another decimal position value 630b associated with another subset of the values of the tensor 610b. The processing unit 100 may adjust the decimal positions 630a and 630b independent of each other. Accordingly, a tensor 630b may comprise multiple subsets of values, each subset of values having a different decimal point value 630.

Overall Process

FIGS. 7, 8, 9, and 11 illustrate various processes for execution of tensor instructions. The steps indicated in each figure may be performed in an order different from that indicated in the corresponding figure. For example, certain steps may be performed in parallel. Furthermore, the steps may be performed by different modules than those indicated herein.

Figure 7:
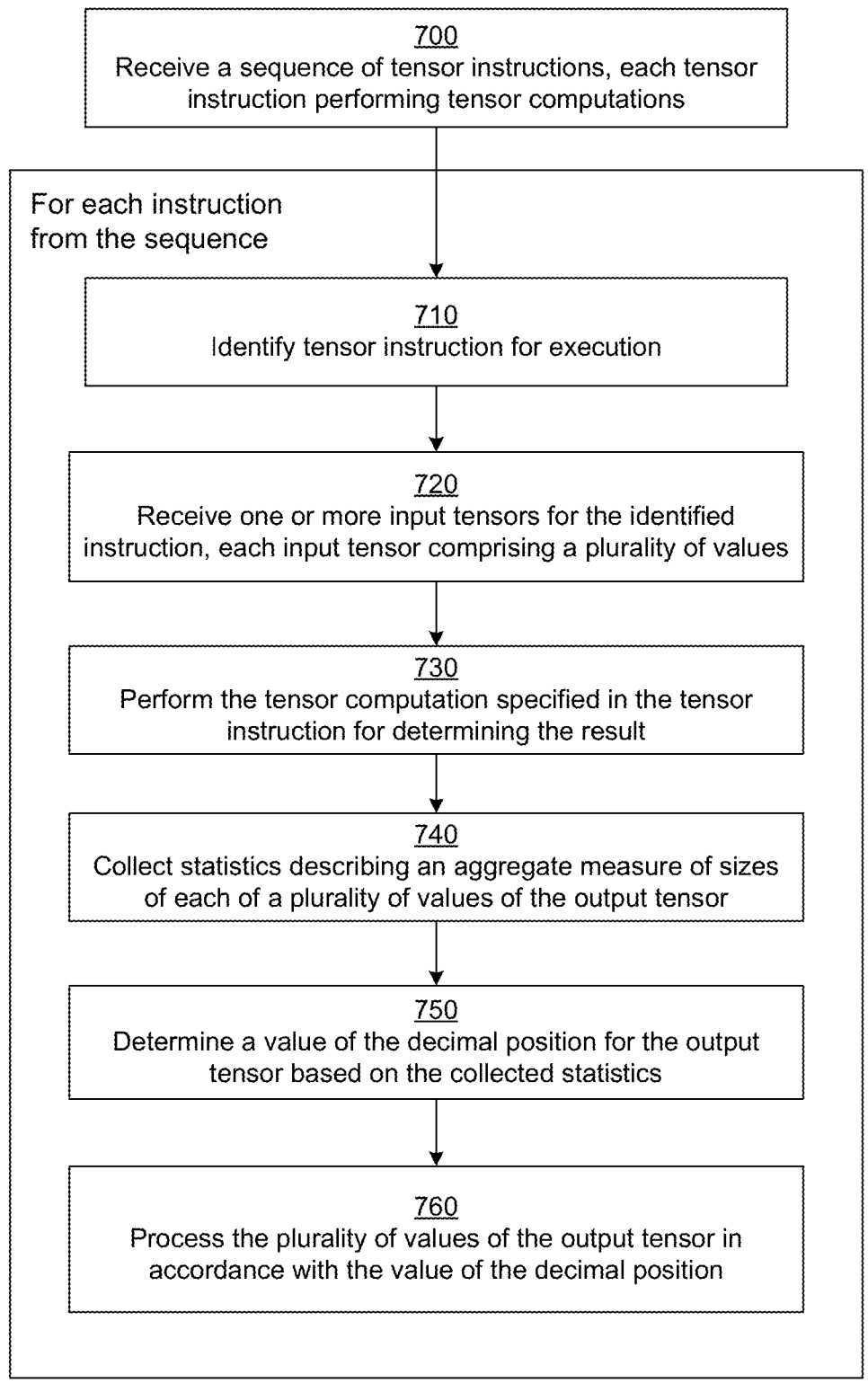
FIG. 7 is a flowchart illustrating details of the process used for managing decimal positions for values of tensors while executing tensor instructions, in accordance with the embodiment.

FIG. 7 is a flowchart illustrating details of the process used for managing decimal positions for values of tensors while executing tensor instructions, in accordance with the embodiment. The processing unit 100 receives 700 a sequence of tensor instructions. The processing unit 100 executes the received sequence of tensor instructions by performing the following steps.

The instruction processing module 510 identifies 720 an instruction from the sequence for execution. The identified tensor instruction specifies one or more of: a tensor computation, one or more input tensors, and one or more output tensors for storing the result of the tensor computation. The instruction processing module 510 receives 720 one or more input tensors for the tensor computation specified in the identified tensor instruction. The tensor computation module 520 performs 730 the tensor computation specified in the tensor instruction. The processing unit 100 stores representations of the input tensors and output tensors in the tensor data store 545.

The tensor statistics module 530 collects 740 statistics describing the values of each output tensor. The tensor decimal position determination module 540 determines 750 a new value of the decimal position for each output tensor based on the statistics collected for the output tensor. This new value is for a subsequent iteration executing the sequence of tensor instructions. In an embodiment, the tensor decimal position determination module 540 determines 750 the new value of the decimal position by performing the following steps. The tensor decimal position determination module 540 receives a previous value of the decimal position for the plurality of values of the output tensor, such that the previous value was determined prior to performing the tensor computation (for example, based on certain initialization procedure or based on a previous iteration that executes the sequence of tensor instructions.) The tensor decimal position determination module 540 determines whether to adjust the received value of the decimal position for the output tensor based on the collected statistics. The tensor decimal position determination module 540 adjusts the received decimal position based on the determination. The tensor decimal position determination module 540 provides the adjusted value of the decimal position as the determined value of the decimal position for the plurality of values of the output tensor. The determined value is used for subsequent iterations executing the sequence of tensor instructions.

Figure 8:
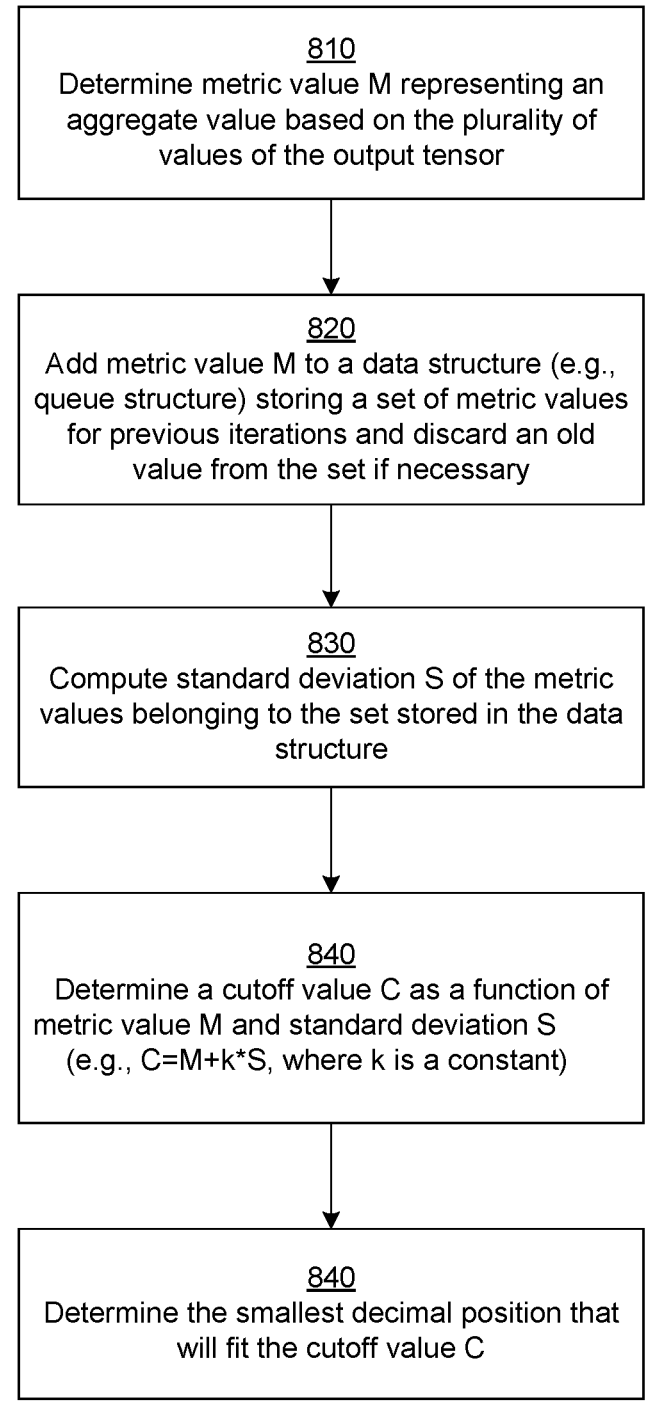
FIG. 8 illustrates various steps performed by the processing unit to determine the decimal position associated with an output tensor, according to an embodiment.

Details of the step determining 750 the decimal position are further described in FIG. 8. In an embodiment, the tensor decimal position determination module 540 determines 750 the decimal position for an output tensor based on an aggregate measure of the sizes of the values of the output tensor. For example, the tensor decimal position determination module 540 determines 750 the decimal position for the output tensor based on a maximum absolute value of an output tensor. In other embodiments, the tensor decimal position determination module 540 determines 750 the decimal position for the output tensor based on other aggregate operations computed over the plurality of the values of the tensor, for example, a median value, an average of absolute values, and so on.

In an embodiment, the tensor decimal position determination module 540 selects a decimal position that provides the highest precision for the plurality of values of the tensor without causing a overflow during a subsequent execution of the tensor instruction. For example, assume that an example value of the metric representing the aggregate measure is 8.0. This example value may be represented as any one of the following binary representations: 00001000. (decimal position 0), 0001000.0 (decimal position 1), 000100.00 (decimal position 2), or 01000.000 (decimal position 3). In this example, the tensor decimal position determination module 540 selects the representation 01000.000 that has a decimal position value of 3 since that provides the highest precision without causing an overflow.

The tensor data store 545 stores data values of the input tensors as well as output tensors for the tensor instructions. A tensor stored in the tensor data store 545 comprises a plurality of numbers (representing data values) and a decimal position corresponding to the plurality of numbers. The processing unit 100 processes 760 the values of each tensor in accordance with the decimal position associated with the tensor. Accordingly, the processing unit 100 determines a value of an element of the tensor based on the number corresponding to the element and the decimal position of the tensor.

In an embodiment, the processing unit 100 performs the steps shown in FIG. 7 repeatedly, each iteration corresponding to a new input received by the sequence of instructions. In an embodiment, the repeated execution of the sequence of instructions corresponds to a neural network computation. However, other embodiments may use the process illustrated in FIG. 7 for other applications, for example, for machine learning, image processing, sensor data analysis, and so on.

In an embodiment, if the processing unit 100 is updating the tensors infrequently (for example, the tensors are updated less frequently than every iteration), the tensor decimal position determination module 540 uses a smaller set of metric values representing the most recent values to determine the measure of variance. For example, the tensor decimal position determination module 540 may use only the 2 most recent values.

In an embodiment, if the tensor decimal position determination module 540 encounters an overflow during the execution of the tensor instruction, the tensor decimal position determination module 540 decreases the decimal position value by a small value, for example, one. The tensor decimal position determination module 540 clears the data structure storing the metric values (e.g., maximum absolute values) of previous iterations. The tensor decimal position determination module 540 reinitializes the data structure storing the metric values with a metric value that is larger than the result value that caused the overflow, for example, a value that is twice the result value that caused the overflow.

Tensor Decimal Position Based on Statistics Collected in Past Iterations

FIG. 8 illustrates steps performed by the processing unit to determine the decimal position associated with an output tensor, according to an embodiment. FIG. 8 shows the steps performed by the processing unit 100 to determine 750 a value of the decimal position for each output tensor as described in FIG. 7. The processing unit 100 repeats the execution of the steps of FIG. 7, for example, for an artificial neural network computation.

The tensor statistics module 530 determines 810 a metric value M representing an aggregate value based on the plurality of values of an output tensor. The aggregate value may be one of, a maximum of absolute values, a median of absolute values, an average of absolute values of the plurality of values, and so on.

The tensor statistics module 530 adds 820 the determined metric value M to a tensor statistics store 555. The tensor statistics store 555 comprises a data structure storing metric values determined for the output tensor during previous executions of the identified tensor instruction. In an embodiment, the tensor statistics store 555 stores the metric values for previous iterations as a queue data structure. However, other embodiments can store the metric values of previous iterations as other data structures, for example, an array, a list, a tree data structure, or a heap data structure.

In an embodiment, the tensor statistics store 555 maintains a moving window of metric values for a fixed number of past iterations, for example, N iterations. After the instruction processing module 510 has executed N iterations, the tensor statistics store 555 deletes a metric value corresponding to an old iteration when a metric value for a new iteration is added. In an embodiment, the tensor statistics store 555 deletes the metric value corresponding to the oldest iteration that was executed.

The tensor statistics module 530 determines a measure of variance of the metric values stored in the tensor statistics store 555. For example, the tensor decimal position determination module 540 determines a standard deviation S of the metric values stored in the tensor statistics store 555. In other embodiments, the tensor statistics store 555 may determine other statistical measures representing variance of the plurality of metric values.

The tensor decimal position determination module 540 determines a cutoff value C as a function of the metric value M of the current iteration and the measure of variance of the plurality of metric values stored in the tensor statistics store 555. In an embodiment, the tensor decimal position determination module 540 determines the cutoff value C to be a sum of the metric value M and a product of the standard deviation S with a predetermined constant. Accordingly, the tensor decimal position determination module 540 determines the cutoff value C as $C=M+k*S+c$, where k and c are predetermined constant values, for example, $k=3$. The tensor decimal position determination module 540 determines the decimal position for the output tensor based on the cutoff value C. In an embodiment, the tensor decimal position determination module 540 selects a value that provides the highest precision without causing an overflow during subsequent executions of the tensor instruction, for example, in a subsequent iteration executing the received sequence of instructions.

The process illustrated in FIGS. 7 and 8 determines a decimal position value in a given iteration such that the decimal position is used in subsequent iterations. Accordingly, the decimal position is selected so as to avoid overflows or underflows during subsequent executions of the instruction. In some embodiments, if the value representing a measure of variance is determined to be zero, the tensor decimal position determination module 540 adds a small constant value to the measure of variance.

Determining Initial Value of Tensor Decimal Position

Figure 9:
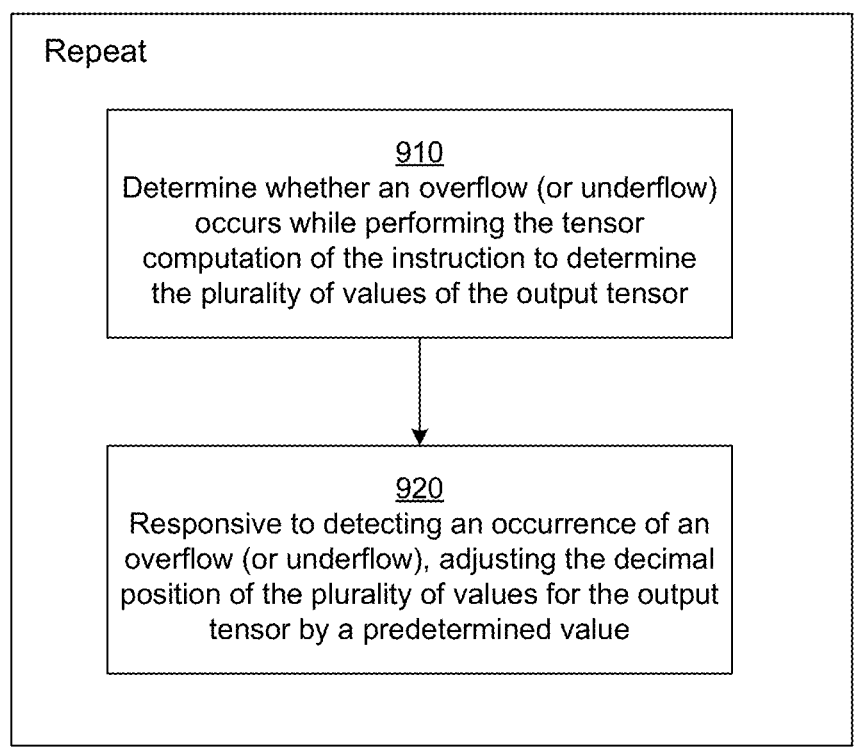
FIG. 9 illustrates the steps performed by the processing unit to determine the decimal position associated with an output tensor, according to another embodiment.

FIG. 9 illustrates the steps performed by the processing unit to determine the decimal position associated with an output tensor, according to another embodiment. The steps illustrated in FIG. 9 are performed in conjunction with the process illustrated in FIG. 7 to determine the initial values of the decimal positions for the output tensors associated with various tensor instructions.

The tensor decimal position determination module 540 initializes the decimal position values for output tensors for various instructions based on a previous execution of the sequence of instructions, if such information is available. However, if no information based on previous executions is available, the tensor decimal position determination module 540 initializes the decimal position values to a predetermined value that is configurable.

The tensor decimal position determination module 540 determines 910 whether an overflow occurs (or an underflow occurs or an underutilization occurs as explained below) while performing the tensor computation of the instruction to determine the plurality of values of the output tensor. If the tensor decimal position determination module 540 determines 910 that an overflow (or underflow or underutilization) occurs while performing the tensor computation, tensor decimal position determination module 540 adjusts the decimal position of the plurality of values for the output tensor by a predetermined value N, for example, where $N=16$ bits.

As an example, a tensor instruction performs tensor additions. Assume that the tensor addition requires addition of two numbers: decimal 7.875 (represented as binary 0111.1110) and decimal 0.5 (represented as binary 0000.1000). Both binary numbers 0111.1110 and 0000.1000 are represented using eight bits and a decimal position 4 indicating that the decimal is after the fourth bit, counting from the least significant bit (starting from right). Performing the addition 0111.1110+0000.1000 causes an overflow since the result of addition is 1000.0110, which in two's complement represents decimal −7.625.

If the tensor decimal position determination module 540 detects that an overflow occurs while executing a tensor instruction, the tensor decimal position determination module 540 moves the decimal position for the output tensor for the tensor instruction to the right by N bits. The processing unit 100 executes the sequence of instructions again and during the next execution of the instruction, the tensor decimal position determination module 540 checks if an overflow occurs again during execution of the tensor instruction. If the tensor decimal position determination module 540 detects an overflow again, the tensor decimal position determination module 540 again moves the decimal position for the output tensor for the tensor instruction to the right by N bits. This process is repeated until the tensor decimal position determination module 540 does not detect an overflow during an execution of the tensor instruction. Subsequently, the tensor decimal position determination module 540 determines the decimal position for the output tensor for the tensor instruction by executing the process illustrated in FIG. 8.

In the above example, the addition of the binary numbers 0111.1110 and 0000.1000 is repeated to obtain the result and the decimal position for the result is moved by $N=4$ bits to the right, i.e., to the decimal position zero. Accordingly, the result of the addition is 00001000., which is decimal 8.0. Although the result has less precision since four least significant bits are removed from the result (while four most significant bits are added), the result is computed without causing an overflow.

Similarly, if the tensor decimal position determination module 540 detects that an underflow occurs while executing a tensor instruction, the tensor decimal position determination module 540 moves the decimal position for the output tensor for the tensor instruction to the left by N bits. The tensor decimal position determination module 540 may detect the underflow by verifying if all the bits of the result of an operation are zero, for example, if 00000000. is the result value. The processing unit 100 executes the sequence of instructions again and during the next execution of the instruction, the tensor decimal position determination module 540 checks if an underflow occurs during the next execution of the tensor instruction. If the tensor decimal position determination module 540 detects an underflow again, the tensor decimal position determination module 540 moves the decimal position for the output tensor for the tensor instruction to the left by N bits. This process is repeated until the tensor decimal position determination module 540 does not detect an overflow during an execution of the tensor instruction. Subsequently, the tensor decimal position determination module 540 determines the decimal position for the output tensor for the tensor instruction by executing the process illustrated in FIG. 8.

In an embodiment, the tensor decimal position determination module 540 detects an underutilization while executing a tensor instruction. The tensor decimal position determination module 540 detects an underutilization in a value if the number of leading zeroes in the value is greater than a threshold. For example, if the tensor decimal position determination module 540 detects that the value has more than 4 leading zeroes, the tensor decimal position determination module 540 may detect an underutilization. The tensor decimal position determination module 540 detects an underutilization in a plurality of values if all the values of the plurality have more than the threshold number of leading zeroes. For example, the tensor decimal position determination module 540 detects an underutilization in a tensor all the values of the tensor have more than the threshold number of leading zeroes. The tensor decimal position determination module 540 detects an underutilization in a tensor if the available bits for storing values of the tensor are not being effectively utilized for storing the values and the tensor decimal position determination module 540 can modify the decimal position value to allow the values to be represented using a higher precision. If the tensor decimal position determination module 540 detects an underutilization, the decimal position determination module 540 moves the decimal position for the output tensor to the left by M, where M is determined based on the number of leading zeroes determined to occur in the values of the tensor. For example, if the tensor decimal position determination module 540 determines that the values of the tensor have Q leading zeroes, the tensor decimal position determination module 540 may shift the decimal position left by Q bits (or by Q-m bits where m is a small constant value).

Figure 10:
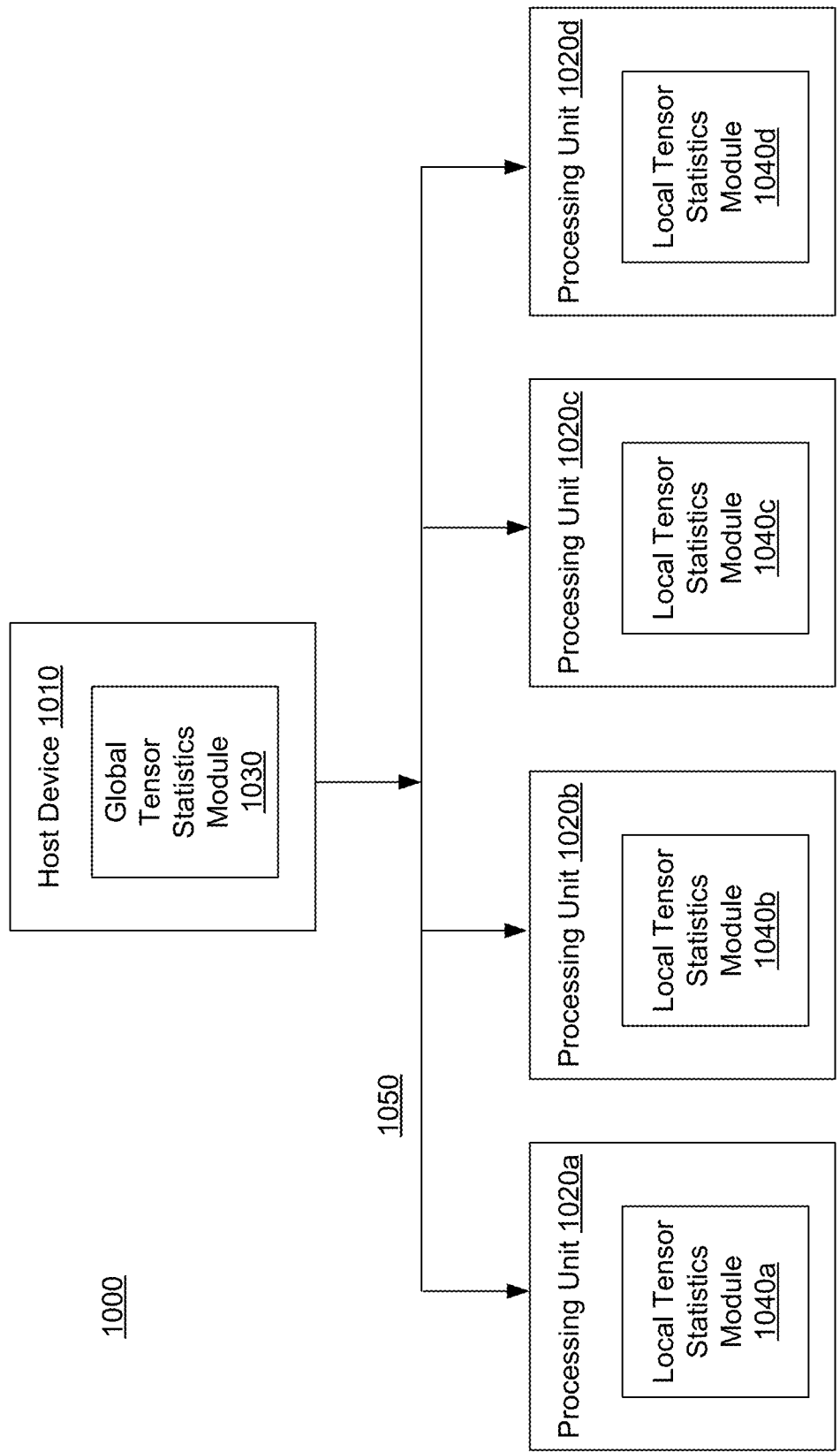
FIG. 10 shows a distributed architecture for performing tensor computations, according to an embodiment.

FIG. 10 shows a parallel/distributed architecture for performing tensor computations, according to an embodiment. The parallel/distributed architecture 1000 comprises a plurality of processing units 1020 and a host device 1010 connected via a network 1050. The network 1050 may be a customized network designed for the parallel/distributed architecture 1000 that allows the host device 1010 to communicate with the processing units 1020 and the processing units 1020 to communicate with each other.

FIG. 10 shows four processing units 1020a, 1020b, 1020c, and 1020d. However a parallel/distributed architecture 1000 may include more or fewer processing units. Typically, a parallel/distributed architecture 1000 includes a large number of processing units 1020, for example, several hundred processing units 1020. The host device 1010 may perform coordination between the various processing units 1020. For example, the host device may transmit a sequence of tensor instructions for execution to each processing unit 1020.

In an embodiment, various tensors are distributed across the various processing units 1020. Accordingly, various processing units 1020 may perform tensor computations on various parts of a tensor in parallel. A tensor may be distributed such that each processing unit includes a set of rows of the tensor, or a set of columns of the tensor, or a block of each tensor. Each processing unit 1020 determines a portion of an output tensor (or result tensor) obtained by executing a tensor instruction. If a processing unit does not store the appropriate portions of various input tensors required to perform a tensor computation, the processing unit interacts with other processing units 1020 to receive the required portions of the input tensors to perform the required computation. In an embodiment, each processing unit 1020 includes a local tensor statistics module 1040 and the host device 1010 includes a global tensor statistics module 1030.

Figure 11:
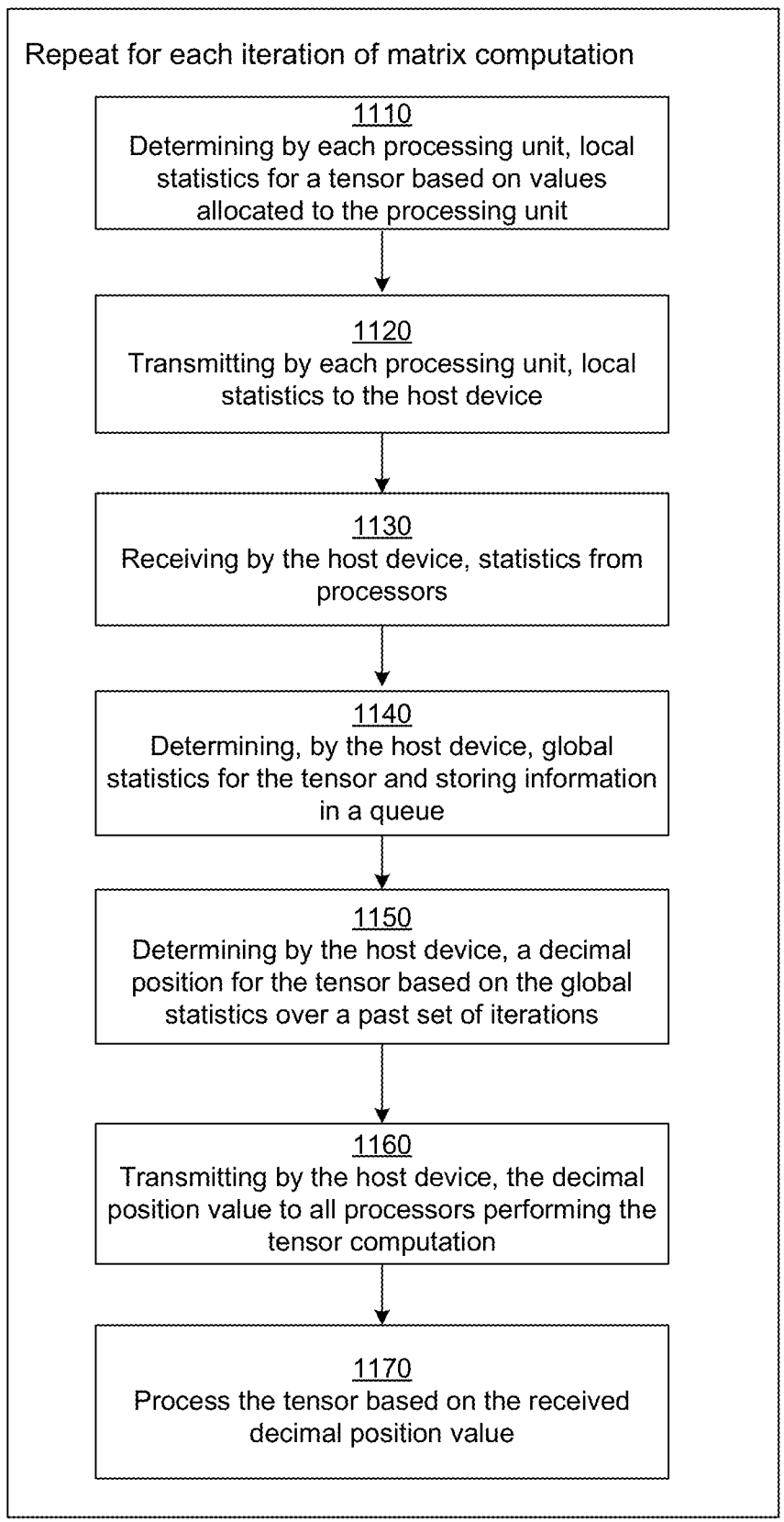
FIG. 11 illustrates the steps performed by processing units in a parallel/distributed architecture to determine the decimal position associated with a tensor, according to an embodiment.

FIG. 11 illustrates the steps performed by processing units in a parallel/distributed architecture to determine the decimal position associated with a tensor, according to an embodiment. The local tensor statistics module 1040 of processing unit 1020 determines 1110 the required statistics based on the portion of a tensor allocated to the processing unit 1020. The processing unit 1020 transmits 1120 the determined value of local statistics to the host device 1010. The host device 1010 receives 1130 the local statistics values received from the various processing units 1020. The host device 1010 combines the local statistics value received from the various processing units 1020 to determine 1140 the global statistics for the tensor.

In an embodiment, the host device maintains a data structure, for example, a queue data structure for storing global statistics describing a tensor across various iterations of execution of the sequence of tensor instructions. The host device 1010 saves the determined global statistics value for the current iteration in the data structure and optionally deletes a corresponding global statistics value corresponding to the oldest iteration stored in the data structure.

The host device 1010 determines 1150, a decimal position for the tensor based on the global statistics over a past set of iterations. The host device 1010 transmits 1160 the decimal position value back to the various processing units 1020. The processing units 1020 store the decimal position for the tensor and process 1170 the values of the tensor based on the stored decimal position, for example, while processing remaining tensor instructions that use the tensor or for processing the next iteration of the sequence of tensor instructions.

Applications

Examples of tensor computations performed based on techniques described herein include deep learning applications, for example, recognizing characteristics of objects in an image. An image is represented as a tensor and tensor computations are performed on the image using techniques disclosed herein. For example, techniques disclosed herein are used in medical image analysis to detect presence of diseases in images of patients, monitoring progression of a disease in a patient based on processing of images taken at various intervals of time, and measuring efficacy of a treatment by analyzing images of a patient undergoing a treatment.

Other example of use of tensor computations using techniques disclosed herein includes image analysis and object classification for accurately measuring and characterizing crops, for example, for determining a dose of fertilizer to be delivered to a plant. Tensor computations based on techniques disclosed herein are used for analyzing tensors representing sensor data including temperature, soil conditions, and humidity for predictive weather analysis for allowing farmers to maximize yield based on predicted weather conditions.

Techniques disclosed herein are further used for processing tensors representing sensor data for guiding autonomous vehicles. These applications perform road sign recognition, obstacle avoidance, and other computations based on the tensor data. Other applications of tensor computations based on disclosed techniques analyze seismic and environmental data, for example, for oil exploration and analysis of real-time data received from sensors at drilling sites, pipelines, and refineries.

Computing Machine Architecture

Figure 12:
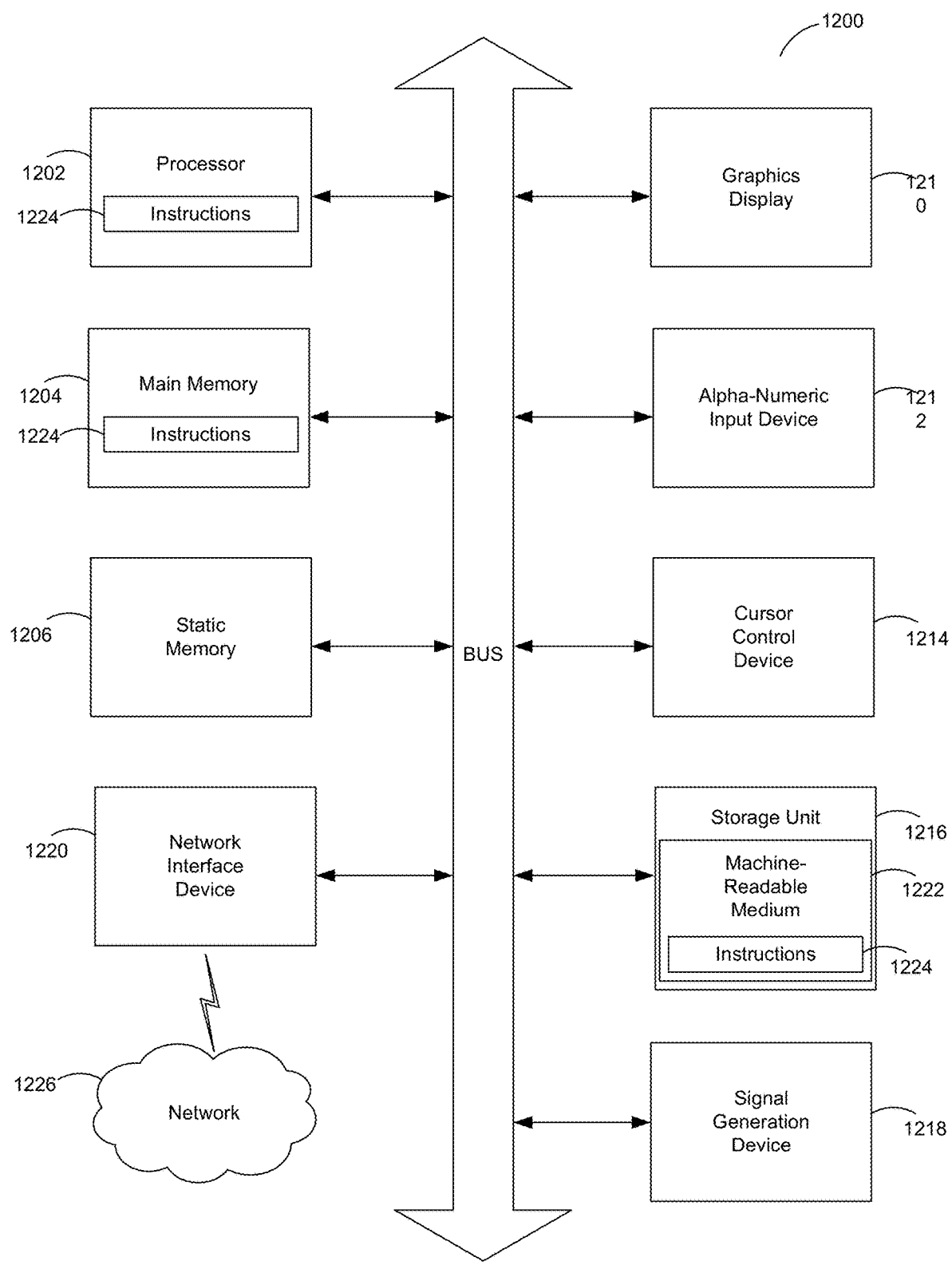
FIG. 12 is a block diagram illustrating components of an example machine able to read instructions from a machine-readable medium and execute them in a processor (or controller).

FIG. 12 is a block diagram illustrating components of an example machine able to read instructions from a machine-readable medium and execute them in a processor (or controller). Specifically, FIG. 12 shows a diagrammatic representation of a machine in the example form of a computer system 1200 within which instructions 1224 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1224 (sequential or otherwise) that specify actions to be taken by that machine. Further, while only a single machine is illustrated, the term "machine" shall also be taken to include any collection of machines that individually or jointly execute instructions 1224 to perform any one or more of the methodologies discussed herein.

The example computer system 1200 includes a processor 1202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1204, and a static memory 1206, which are configured to communicate with each other via a bus 1208. The computer system 1200 may further include graphics display unit 1210 (e.g., a plasma display panel (PDP), a liquid crystal display (LCD), a projector, or a cathode ray tube (CRT)). The computer system 1200 may also include alphanumeric input device 1212 (e.g., a keyboard), a cursor control device 1214 (e.g., a mouse, a trackball, a joystick, a motion sensor, or other pointing instrument), a storage unit 1216, a signal generation device 1218 (e.g., a speaker), and a network interface device 1220, which also are configured to communicate via the bus 1208.

The storage unit 1216 includes a machine-readable medium 1222 on which is stored instructions 1224 (e.g., software) embodying any one or more of the methodologies or functions described herein. The instructions 1224 (e.g., software) may also reside, completely or at least partially, within the main memory 1204 or within the processor 1202 (e.g., within a processor's cache memory) during execution thereof by the computer system 1200, the main memory 1204 and the processor 1202 also constituting machine-readable media. The instructions 1224 (e.g., software) may be transmitted or received over a network 1226 via the network interface device 1220.

While machine-readable medium 1222 is shown in an example embodiment to be a single medium, the term "machine-readable medium" should be taken to include a single medium or multiple media (e.g., a centralized or distributed database, or associated caches and servers) able to store instructions (e.g., instructions 1224). The term "machine-readable medium" shall also be taken to include any medium that is capable of storing instructions (e.g., instructions 1224) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is configurable (e.g., a field programmable gate array (FPGA)) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

While particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer system comprising:
   one or more processors for performing a neural network computation; and
   a non-transitory computer readable storage medium storing instructions for executing a neural network computation by the one or more processors, the neural network computation specified as a sequence of tensor instructions, the instructions when executed by the one or more processors cause the one or more processors to:
   identify a tensor instruction from the sequence of tensor instructions, the tensor instruction specifying a tensor computation associated with the neural network computation, the tensor computation receiving one or more input tensors and determining an output tensor representing a result of the tensor computation;
   receive one or more input tensors for the identified tensor instruction, each input tensor comprising a plurality of values, each value stored as a number in a memory associated with the one or more processors;
   for each of the one or more input tensors, receive a decimal position associated with the plurality of values of the input tensor;
   determine a value of the decimal position for the plurality of values of the output tensor;
   determine a plurality of values of the output tensor by performing the tensor computation specified in the identified tensor instruction; and
   collect statistics describing an aggregate measure of sizes of values of the plurality of values of the output tensor for determining a subsequent value of the decimal position for the plurality of values of the output tensor.

2. The computer system of claim 1, wherein determining the subsequent value of the decimal position for the plurality of values of the output tensor causes the one or more processors to:
   receive a value of the decimal position for the plurality of values of the output tensor, the value determined prior to performing the tensor computation;
   determine whether to adjust the received value of the decimal position for the output tensor based on the collected statistics;
   responsive to determining to adjust, adjusting the received value of the decimal position; and
   providing the adjusted value of the decimal position as the determined value of the decimal position for the plurality of values of the output tensor.

3. The computer system of claim 2, wherein determining whether to adjust a value of the decimal position causes the one or more processors to:
   detect, an occurrence of one of: an underflow, an underutilization, or an overflow while determining the plurality of values of the output tensor; and
   responsive to detecting the occurrence of the underflow, the underutilization, or the overflow, adjust the decimal position for the plurality of values of the output tensor by a predetermined value.

4. The computer system of claim 3, wherein determining whether to adjust a value of the decimal position causes the one or more processors to:
   detect an occurrence of an overflow while determining the plurality of values of the output tensor; and
   responsive to detecting the occurrence of the overflow, move the decimal position for the plurality of values of the output tensor to the right by a predetermined value.

5. The computer system of claim 3, wherein determining whether to adjust a value of the decimal position causes the one or more processors to:
  detect an occurrence of an underflow while determining the plurality of values of the output tensor; and
  responsive to detecting the occurrence of the underflow, move the decimal position for the plurality of values of the output tensor to the left by a predetermined value.

6. The computer system of claim 3, wherein determining whether to adjust a value of the decimal position causes the one or more processors to:
  detect an occurrence of an underutilization while determining the plurality of values of the output tensor, wherein detecting the occurrence of underutilization of a value comprises checking if the value has more than a threshold number of leading zeroes; and
  responsive to detecting the occurrence of the underutilization, move the decimal position for the plurality of values of the output tensor to the left by a predetermined value.

7. The computer system of claim 1, wherein the collected statistics represents a maximum of the absolute values of the plurality of values.

8. The computer system of claim 1, wherein collecting statistics comprises:
  storing in a data structure, a plurality of metric values determined over a plurality of iterations of executions of the sequence of tensor instructions, each metric value indicating a measure of the size of values of the tensor in an iteration, each iteration representing an execution of the sequence of instructions;
  determining a metric representing variance of the plurality of metric values; and
  wherein the decimal position for the output tensor is determined based on the variance of the plurality of metric values.

9. A non-transitory computer readable storage medium storing instruction for executing a sequence of tensor instructions, the instructions for:
  identifying, by one or more processors, a tensor instruction from the sequence of tensor instructions, the tensor instruction specifying a tensor computation associated with the neural network computation, the tensor computation receiving one or more input tensors and determining an output tensor representing a result of the tensor computation;
  receiving, by the one or more processors, one or more input tensors for the identified tensor instruction, each input tensor comprising a plurality of values, each value stored as a number in a memory associated with the one or more processors;
  for each of the one or more input tensors, receiving a decimal position associated with the plurality of values of the input tensor;
  determining a value of the decimal position for the plurality of values of the output tensor;
  determining a plurality of values of the output tensor by performing the tensor computation specified in the identified tensor instruction;
  collecting statistics describing an aggregate measure of sizes of values of the plurality of values of the output tensor for determining a subsequent value of the decimal position for the plurality of values of the output tensor.

10. The non-transitory computer readable storage medium of claim 9, wherein the sequence of instructions performing tensor computations are executed repeatedly for performing a neural network computation.

11. The non-transitory computer readable storage medium of claim 9, wherein determining the subsequent value of the decimal position for the plurality of values of the output tensor comprises:
  receiving a value of the decimal position for the plurality of values of the output tensor, the value determined prior to performing the tensor computation;
  determining whether to adjust the received value of the decimal position for the output tensor based on the collected statistics;
  responsive to determining to adjust, adjusting the received value of the decimal position; and
  providing the adjusted value of the decimal position as the determined value of the decimal position for the plurality of values of the output tensor.

12. The non-transitory computer readable storage medium of claim 11, wherein determining whether to adjust a value of the decimal position comprises, repeating one or more times:
  detecting, an occurrence of one of: an underflow, an underutilization, or an overflow while determining the plurality of values of the output tensor; and
  responsive to detecting the occurrence of the underflow, the underutilization, or the overflow, adjusting the decimal position for the plurality of values of the output tensor by a predetermined value.

13. The non-transitory computer readable storage medium of claim 11, wherein determining whether to adjust a value of the decimal position comprises, repeating one or more times:
  detecting an occurrence of an overflow while determining the plurality of values of the output tensor; and
  responsive to detecting the occurrence of the overflow, moving the decimal position for the plurality of values of the output tensor to the right by a predetermined value.

14. The non-transitory computer readable storage medium of claim 11, wherein determining whether to adjust a value of the decimal position comprises, repeating one or more times:
  detecting an occurrence of an underflow while determining the plurality of values of the output tensor; and
  responsive to detecting the occurrence of the underflow, moving the decimal position for the plurality of values of the output tensor to the left by a predetermined value.

15. The non-transitory computer readable storage medium of claim 11, wherein determining whether to adjust a value of the decimal position comprises, repeating one or more times:
  detecting an occurrence of an underutilization while determining the plurality of values of the output tensor, wherein detecting the occurrence of underutilization of a value comprises checking if the value has more than a threshold number of leading zeroes; and
  responsive to detecting the occurrence of the underutilization, move the decimal position for the plurality of values of the output tensor to the left by a predetermined value.

16. The non-transitory computer readable storage medium of claim 9, wherein determining the value of the decimal position for the plurality of values of the output tensor comprises determining whether one or more of the plurality of values of the output tensor for the instruction are likely to perform one of:

exceeding a threshold value responsive to a subsequent execution of the instruction, or reducing below a threshold value responsive to subsequent execution of the instruction.

17. The non-transitory computer readable storage medium of claim 9, wherein the plurality of values of the output tensor is a first plurality of values and the output tensor further comprises a second plurality of values, further storing instructions for:

collecting statistics describing an aggregate measure of sizes of values of the second plurality of values of the output tensor; and determining a second value representing the decimal position for the second plurality of values of the output tensor based on the aggregate measure of sizes of values of the second plurality of values.

18. The non-transitory computer readable storage medium of claim 9, wherein the collected statistics represents a maximum of the absolute values of the plurality of values.

19. The non-transitory computer readable storage medium of claim 9, wherein performing the computation associated with the instruction is performed by a plurality of processing units, each processing unit associated with a portion of the tensor, wherein collecting statistics comprises:

determining, by each of the plurality of processing units, a metric representing sizes of the values of the portion of the tensor associated with the processing unit; and sending, by each of the plurality of processing units, the metric to a host device.

20. The non-transitory computer readable storage medium of claim 19, wherein collecting statistics further comprises:

receiving, by the host device, from each of the plurality of processing units, the metric representing sizes of the values of the portion of the tensor associated with the processing unit;

determining, by the host device, a metric value describing the size of the values of the tensor by aggregating the metric values received from the plurality of processing units;

determining, by the host device, a value representing the decimal position for the tensor based on the metric value describing the size of the values of the tensor; and sending, by the host device, to each of the plurality of processing units, the value representing the decimal position for the tensor.

21. The non-transitory computer readable storage medium of claim 19, further comprising:

adding the metric value describing the size of the values of the tensor to a data structure representing a plurality of metric values, each metric value associated with a previous execution of the instruction.

22. The non-transitory computer readable storage medium of claim 19, wherein collecting statistics comprises:

storing in a data structure, a plurality of metric values determined over a plurality of iterations of executions of the sequence of tensor instructions, each metric value indicating a measure of the size of values of the tensor in an iteration, each iteration representing an execution of the sequence of instructions;

determining a metric representing variance of the plurality of metric values; and wherein the decimal position for the output tensor is determined based on the variance of the plurality of metric values.

23. A method for executing a sequence of instructions performing tensor computations, the method comprising:

identifying, by one or more processors, a tensor instruction from the sequence of tensor instructions, the tensor instruction specifying a tensor computation associated with the neural network computation, the tensor computation receiving one or more input tensors and determining an output tensor representing a result of the tensor computation;

receiving, by the one or more processors, one or more input tensors for the identified tensor instruction, each input tensor comprising a plurality of values, each value stored as a number in a memory associated with the one or more processors;

for each of the one or more input tensors, receiving a decimal position associated with the plurality of values of the tensor;

determining a value of the decimal position for the plurality of values of the output tensor;

determining a plurality of values of the output tensor by performing the tensor computation specified in the instruction;

collecting statistics describing an aggregate measure of sizes of values of the plurality of values of the output tensor for determining a subsequent value of the decimal position for the plurality of values of the output tensor.

24. The method of claim 23, wherein determining the subsequent value of the decimal position for the plurality of values of the output tensor comprises:

receiving a value of the decimal position for the plurality of values of the output tensor, the value determined prior to performing the tensor computation;

determining whether to adjust the received value of the decimal position for the output tensor based on the collected statistics;

responsive to determining to adjust, adjusting the received value of the decimal position; and providing the adjusted value of the decimal position as the determined value of the decimal position for the plurality of values of the output tensor.

25. The method of claim 24, wherein determining whether to adjust a value of the decimal position comprises, repeating one or more times:

detecting, while determining the plurality of values of the output tensor, an occurrence of one of: an underflow, an underutilization, or an overflow; and responsive to detecting the occurrence of the underflow, the underutilization, or the overflow, adjusting the decimal position for the plurality of values of the output tensor by a predetermined value.

26. The method of claim 23, wherein collecting statistics comprises:

storing a plurality of metric values, each metric value indicating a measure of the size of values of the tensor in an iteration, each iteration representing an execution of the sequence of instructions;

determining a metric representing variance of the plurality of metric values; and wherein determining whether to adjust a value of the decimal position for the output tensor is further based on the variance of the plurality of metric values.

* * * * *